(12) United States Patent
Barraclough (10) Patent No.: US 7,202,884 B1
(45) Date of Patent: Apr. 10, 2007

(54) SURVEILLANCE METHOD AND SYSTEM (75) Inventor: Keith Barraclough, Mountain View, CA (US)

(73) Assignee: 8x8, Inc., Santa Clara, CA (US)

( * ) Notice: Subject to any disclaimer, the term of this patent is extended or adjusted under 35 U.S.C. 154(b) by 896 days.

(21) Appl. No.: 09/885,298

(22) Filed: Jun. 20, 2001

Related U.S. Application Data (60) Provisional application No. 60/213,048, filed on Jun. 21, 2000.

(51) Int. Cl.
*H04N 7/14* (2006.01)
(52) U.S. Cl. .............................. 348/14.01; 348/14.08; 348/143
(58) Field of Classification Search .............. 348/14.01, 348/14.02, 14.03, 14.05, 14.08, 14.09, 14.1, 348/143, 153; 340/539.11, 539.25, 539.1; 725/105–108; 709/203–205
See application file for complete search history.

(56) References Cited

U.S. PATENT DOCUMENTS

| | | | | |
|---|---|---|---|---|
| 5,790,174 A | * | 8/1998 | Richard et al. | ............... 725/99 |
| 5,920,693 A | * | 7/1999 | Burkman et al. | ........... 709/204 |
| 5,929,897 A | * | 7/1999 | Schneider et al. | ....... 348/14.08 |
| 6,011,579 A | * | 1/2000 | Newlin | .................... 348/14.08 |
| 6,529,230 B1 | * | 3/2003 | Chong | ..................... 348/14.01 |
| 6,671,520 B1 | * | 12/2003 | Kim | ......................... 455/556.1 |
| 6,698,021 B1 | * | 2/2004 | Amini et al. | ............... 725/105 |
| 6,747,554 B1 | * | 6/2004 | Higashimura et al. | ...... 340/506 |

FOREIGN PATENT DOCUMENTS

| | | | |
|---|---|---|---|
| GB | 2325548 A | * | 11/1998 |
| JP | 09330283 A | * | 12/1997 |

* cited by examiner

*Primary Examiner*—Melur Ramakrishnaiah
(74) *Attorney, Agent, or Firm*—Crawford Maunu PLLC (57) ABSTRACT

The present invention is directed to a low-cost, remotely accessible surveillance method and system easily adaptable for personal or small-entity use. In one example embodiment, a request for image data is delivered via a first communications system, such as a telephone system, to a programmable surveillance system. The programmable surveillance system has a camera adapted to capture images that are processed as data by a first computer arrangement. In response to the request from the first communications system, the programmable surveillance system automatically accesses and delivers image data captured by the camera to a second communications system. A second computer arrangement is adapted to communicatively couple with the second communications system and to receive and process data including the image data delivered by the first computer arrangement. The received image data is displayed using the second computer arrangement, facilitating on-demand, remote image monitoring.

37 Claims, 3 Drawing Sheets

SURVEILLANCE METHOD AND SYSTEM

RELATED APPLICATIONS

This nonprovisional application claims priority to, and hereby incorporates, Provisional Application No. 60/213,048, and only to the extent needed for pendency, this is alternatively a conversion of Provisional Application No. 60/213,048, filed on Jun. 21, 2000.

This application is related to, and fully incorporates by reference, U.S. patent application Ser. No. 09/176,994, entitled "Video Communication/Monitoring Apparatus And Method Therefor," filed Oct. 22, 1998 and now U.S. Pat. No. 6,226,031, U.S. patent application Ser. No. 08/977,568, entitled "Communication Interface Between Remote Transmission of Both Compressed Video and Other Data and Data Exchange with Local Peripherals" filed Nov. 25, 1997 and now U.S. Pat. No. 6,119,178, U.S. Provisional Application Ser. No. 60/212,953 filed Jun. 21, 2000, now concurrently filed herewith as U.S. Nonprovisional Patent Application Ser. No. 09/885,869, entitled "Personal Alert Surveillance" now abandoned, and U.S. patent application Ser. No. 08/975,768, entitled "Computer Architecture for Video Data Processing and Method Thereof," filed Nov. 21, 1997 and now U.S. Pat. No. 6,104,836.

FIELD OF THE INVENTION

The present invention relates to image communication systems, and more particularly, to video communication involving monitoring and security applications.

BACKGROUND OF THE INVENTION

Image communication systems span a variety of applications. One such application is security monitoring. Security monitoring typically involves system control and display functions located at a central station. The central station includes multiple video-communication paths, each path connecting to a remotely-located display camera. Traditionally, the significant expense of security monitoring systems has limited their practicability to larger facilities.

Recent developments in communication standards and compression/decompression techniques have permitted enhanced security-system implementations. One approach involves using a remote camera that responds to changes in motion or audio as a determining factor for transmitting captured video and audio data to the control station. Another approach uses a remote server station that connects to several cameras, with the server station coupling to a telephone line for reporting back to the control station. These and other recent implementations are directed to markets ranging from retail shops to large industrial warehouses.

Widespread acceptance and usage of security-system implementations are largely a function of the difficulty of system implementation and the cost, and therefore have largely been limited to commercial markets. The systems described above are difficult to implement in many respects. Often, such systems are difficult to install and operate, in part due to their complexity and lack of user-friendly operation. In addition, the complexity of such systems also adds to the initial purchase cost and complicates the installation process, adding more cost. The operation of such systems may also require monitoring, adding still more cost.

As with most other systems, reduced cost is realized through cost-effective mass production. The initial costs to effect such a mass production, however, can be exorbitant. Moreover, widespread acceptance and usage of such technology cannot be forced, even when appropriately addressing the marketing needs and overcoming the exorbitant costs of the mass production equipment. Consequently, efforts to launch the appropriate technology for practicable acceptance and usage of security systems have been difficult. Therefore, there is a need for a low-cost, user-friendly security system that is easy to implement.

SUMMARY OF THE INVENTION

The present invention is exemplified in a number of implementations and applications, one of which is summarized below. According to an example embodiment, the present invention is directed to a low-cost surveillance method and system easily adaptable for personal or small-entity use. A first communications system is communicatively coupled and adapted to deliver a request for image data, such as a request sent via a telephone, to a programmable surveillance system having a first computer arrangement and a camera. The first computer arrangement is adapted to process data including image data, and the camera is configured and arranged to capture images that are processed as data by the first computer arrangement. In response to the request from the first communications system, the programmable surveillance system automatically accesses and delivers image data to a second communications system coupled and adapted to transmit image data, such as via the Internet. A second computer arrangement is adapted to communicatively couple with the second communications system and to receive and process data including the image data delivered by the first computer arrangement.

The above summary of the present invention is not intended to describe each illustrated embodiment or every implementation of the present invention. The figures and following detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to a variety of different types of security-monitoring applications, and the invention has been found to be particularly advantageous for applications requiring, or benefiting from, cost-effective on-demand personal security monitoring applications. According to an example embodiment of the present invention, a video camera is located in a monitoring location, such as a retail establishment. The video camera is connected to a first computer arrangement adapted to receive image data captured by the video camera. A remote user contacts the first computer arrangement via a first communications system, such as a plain-old-telephone-system (POTS), and delivers a request for image data to the first computer arrangement. In response to the request, the first computer arrangement accesses images received from the video camera, connects to a second communications system, such as a system including the Internet, and transfers the image data via the second communications system to a second computer arrangement. The second computer arrangement is adapted to receive the image data from the first computer arrangement, and to display the image data for monitoring. In this manner, remote monitoring of the retail establishment is facilitated using simple computer arrangements and relatively inexpensive and easily accessible communications systems.

Figure 1:
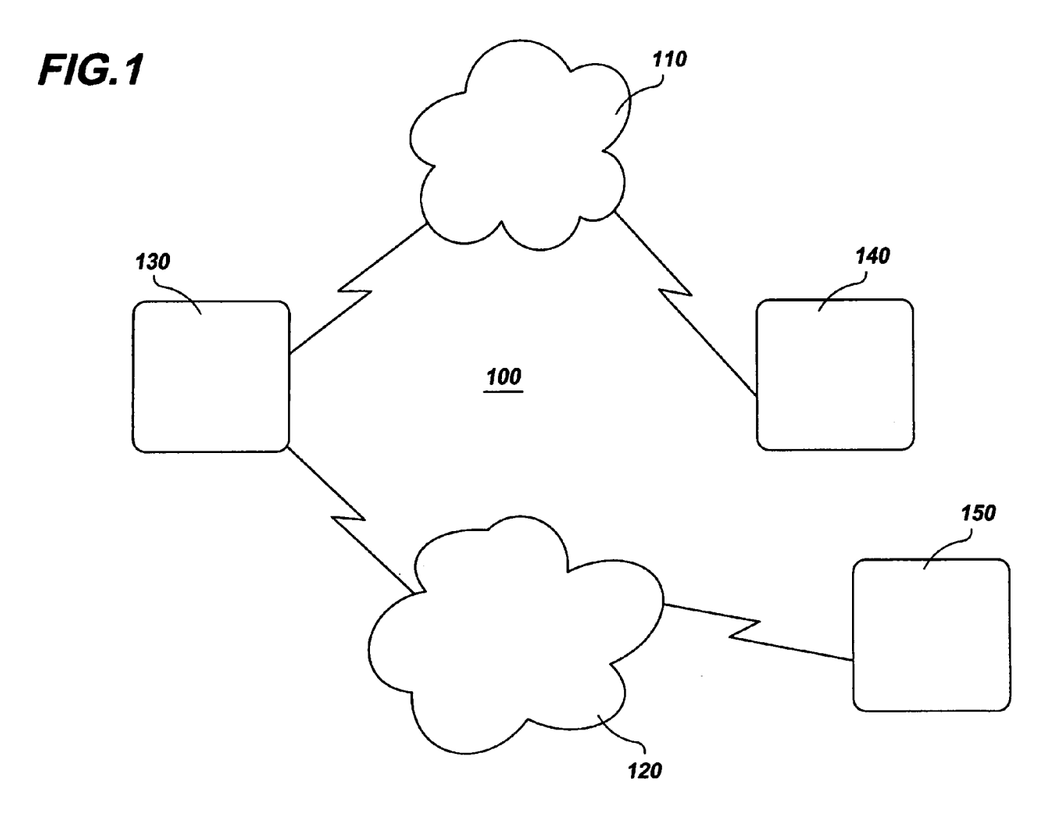
FIG. 1 is a surveillance system, according to an example embodiment of the present invention.

The above described example embodiment can be implemented in a variety of methods. For example, FIG. 1 shows a system 100 for remote security monitoring. A request for image data is sent via a first communications system 110 to a programmable surveillance system 130 from a communications device 140. The programmable surveillance system 130 captures image data and, in response to the request, delivers the image data to a second communications system 120. A computer monitoring arrangement 150 is coupled to the second communications system 120 and is adapted to receive the image data delivered by the surveillance system 130.

In one particular example embodiment, the communications device 140 includes a telephone, and the first communications system 110 includes a POTS. A remote user calls the programmable surveillance system using the telephone, and sends a request for image data via the first communications system 110. The request may include a variety of data. For instance, the request may include a caller ID number. The programmable surveillance system is programmed with one or more caller ID numbers corresponding to remote user telephone communication sources. Upon receiving the call, the programmable surveillance system is adapted to determine the caller ID number and compare it with the programmed caller ID numbers. In response to finding a matching caller ID, the programmable surveillance system accesses and delivers image data.

In another example embodiment, the request includes an access code. For example, the access code may include a code that can be entered using a touch-tone phone. When a remote user calls the programmable surveillance system 130 using a telephone, the remote user enters a code via the touch-tone keypad of the telephone. The programmable surveillance system 130 is programmed with one or more access codes, and compares the code entered by the remote user to the programmed access codes. Upon finding a matching code, the programmable surveillance system accesses and delivers image data.

In another example embodiment, the request includes a selection from a menu. The programmable surveillance system is programmed with a menu having selections. The menu selections include options for delivering the image data, such as the type of data to be delivered and the method in which to deliver the data. For example, a plurality of image capture devices may be coupled to the programmable surveillance system, and the menu selections may include selecting which one or ones of the images captured will be delivered. This is particularly useful for security monitoring or supervision of a plurality of locations, such as retail establishments and/or manufacturing facilities. The menu selections may also include a choice of delivery destinations, such as to a particular Internet server, a particular telephone line, or a particular computer coupled to the programmable surveillance system via a network.

Figure 2:
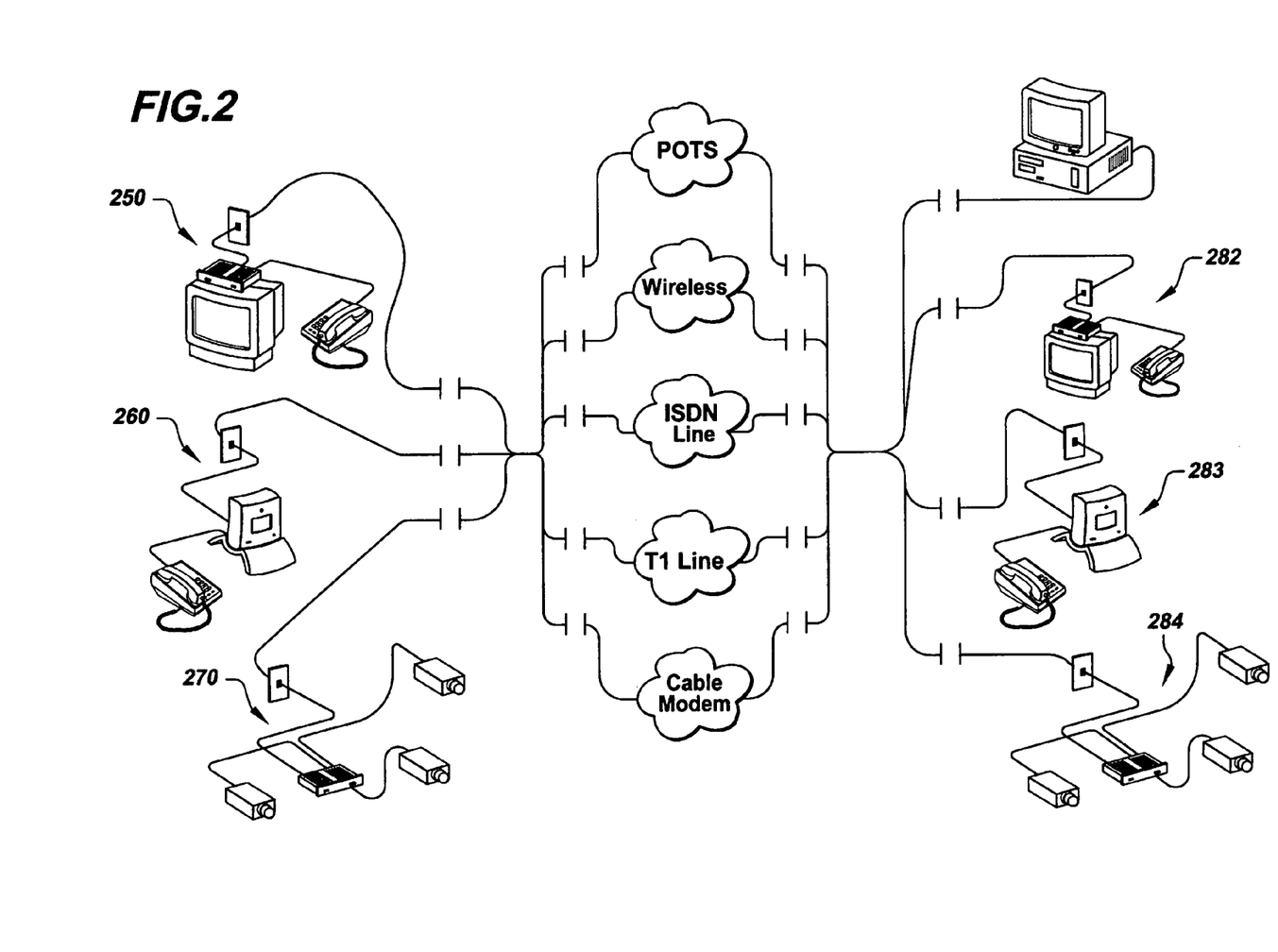
FIG. 2 is another surveillance system, according to an example embodiment of the present invention.

Several example programmable surveillance system components, communications systems, and monitoring arrangements adaptable for use in connection with example embodiments of the present invention are shown in FIG. 2. For example, with slight programming modifications, the programmable surveillance system 100 can be implemented using any or a combination of various products (units and/or software packages) available from 8×8, Inc. of Santa Clara, Calif. Such models include the VC50, VC105, VC110, VC150, VC160, and RSM-1500. For informational brochures for models VC110, VC160, and RSM-1500, reference may be made to appendices A, B, and C in U.S. Provisional Application Ser. No. 60/212,953 filed Jun. 21, 2000, now concurrently filed herewith as U.S. Nonprovisional Patent Application Ser. No. 09/885,869, entitled "Personal Alert Surveillance" now abandoned, which is incorporated herein by reference. Models included in the referenced appendix are shown as part of arrangements 250, 260, 270, 282, 283, and 284.

These above products include a video processor architecture based on a multiple processor chip having uniquely arranged RISC and DSP type processors. While this type of chip is not required for implementation of the above-characterized embodiments, those familiar with current marketplace trends in video processing will appreciate the benefits these arrangements provide. For additional information concerning such video processing arrangements, reference may be made to the characterization of these architectures, as well as other security-related features, in U.S. patent application Ser. No. 09/176,994, entitled "Video Communication/Monitoring Apparatus And Method Therefor," filed Oct. 22, 1998 and now U.S. Pat. No, 6,226,031.

Figure 3:
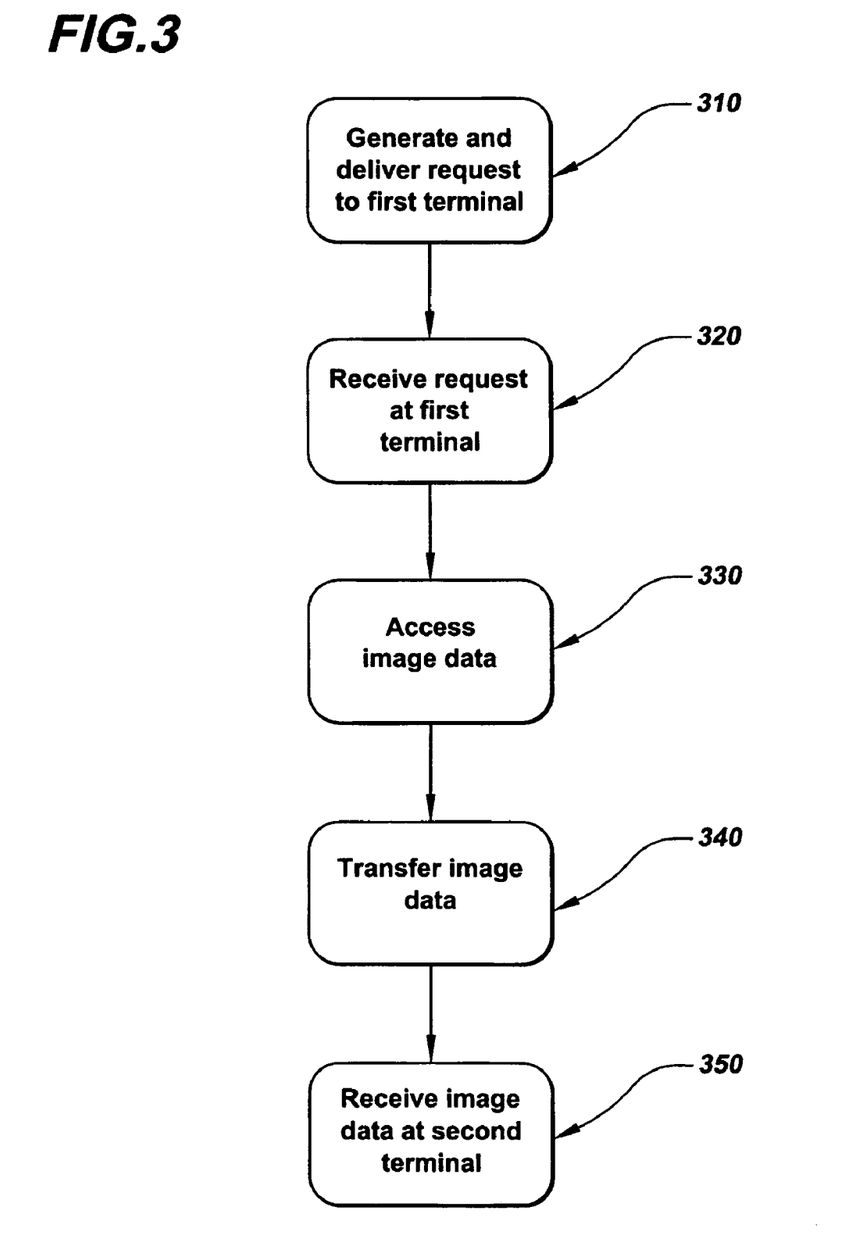
FIG. 3 is a flow diagram showing a method for surveillance, according to another example embodiment of the present invention.

FIG. 3 is a flow diagram exemplifying particular embodiments of the present invention. At block 310, a request for image data is delivered to a first computer terminal via a communications system. The request is received at the first terminal at block 320, and the first terminal accesses image data in response to the request at block 330. Accessing the image data may, for example, include accessing stored data, or may include gathering new data. At block 340, the accessed image data is transferred via a communications system, and the transferred data is received and viewed at a second terminal 350.

In another more particular example embodiment, the programmable surveillance system is further programmed to include pre-programmed delivery information that can be associated with each programmed caller ID number or access code. The delivery information includes instructions for one or more delivery options available to the programmable surveillance system. For example, one delivery option includes terminating the incoming call from the remote user, automatically calling the remote user back via the same or other communications system, and delivering image data captured at the camera to the remote user.

Another delivery option includes connecting to the second communications system, wherein the second communications system includes the Internet, and delivering the image data via an Internet service provider (ISP) to the computer monitoring arrangement 150. Such Internet delivery may include streaming video such as that supported by RealAudio. The ISP may be contacted using a telephone modem used to receive the request, wherein the programmable surveillance system hangs up and dials the ISP, or a second communications system may be used, such as having another POTS line, DSL line, cable modem, or other Internet access system.

Yet another delivery option includes connecting to the computer monitoring arrangement 150 via the second communications system, wherein the second communications system includes a POTS, and delivering the image data via the POTS. Other delivery or request communications systems may include wireless systems, paging systems, or email systems.

Various image data forms are readily adaptable for use in accordance with the present invention. For example, the image data may be delivered as streaming video over the Internet, wherein the computer monitoring arrangement 150 is adapted to receive and display the streaming video. In another example, the programmable surveillance system is further configured to capture audio, the image data includes audio data, and the second computer arrangement is adapted to process and play the audio. The image data may also protected, such as via encryption or via a password. The computer monitoring arrangement is adapted to receive the protected data and decrypt or decode the password protection of the image data. Compression methods may also be used, wherein the image data is compressed prior to delivery to the monitoring location, and is decompressed at the monitoring location for viewing.

While the present invention has been described with reference to several particular example embodiments, those skilled in the art will recognize that many changes may be made to the present invention without departing from the spirit and scope of the present invention, which is set forth in the following claims.

What is claimed is:

1. A surveillance system comprising:
   a first communications system communicatively coupled and adapted to deliver a request for image data;
   a second communications system communicatively coupled and adapted to transmit image data;
   a programmable surveillance system including a first computer arrangement for processing data including image data, and including a camera configured and arranged to capture images, wherein the captured images are processed as data by the first computer arrangement, and wherein the programmable system is configured and arranged to receive the request for image data from the first communications system, and, in response to the request, to automatically access and deliver image data to the second communications system; and
   a second computer arrangement for communicatively coupling with the second communications system, and for processing data including image data, and configured and arranged to retrieve image data delivered by the first computer arrangement.

2. A surveillance system, according to claim 1, wherein at least one of the first and the second communications systems includes the Internet, and wherein the programmable surveillance system accesses the Internet by logging on to the Internet via an internet service provider (ISP).

3. A surveillance system, according to claim 1, wherein at least one of the first and the second communications systems include a plain-old-telephone-system (POTS).

4. A surveillance system, according to claim 1, wherein at least one of the first and the second communications systems include a wireless system.

5. A surveillance system, according to claim 1, wherein at least one of the first and the second communications systems include a paging system.

6. A surveillance system, according to claim 1, wherein at least one of the first and the second communications systems include an email system.

7. A surveillance system, according to claim 1, wherein the first communications system includes a telephone, wherein the programmable surveillance system is adapted to receive a telephone call from the telephone and, in response to the telephone call, offer an audio menu of choices for delivery of the video data, wherein the telephone is adapted to deliver a response to the audio menu, and wherein the programmable surveillance system is further adapted to respond to the response to the audio menu.

8. A surveillance system, according to claim 1, wherein the request for image data includes the provision of a caller ID number, wherein the programmable surveillance system is programmed with at least one stored caller ID number, and wherein the programmable surveillance system is adapted to detect the caller ID number of the request and compare the caller ID number with the at least one stored caller ID number and, in response to detecting a match, automatically access and deliver image data.

9. A surveillance system, according to claim 8, wherein each of the at least one stored caller ID numbers includes a programmed communications delivery method, and wherein the programmable surveillance system is adapted to automatically access and deliver image data via the programmed communications delivery method corresponding to the matched caller ID number.

10. A surveillance system, according to claim 1, wherein the first communications system includes a telephone, wherein the programmable surveillance system is programmed with an access code and adapted to receive a telephone call from the telephone and, in response to the telephone call, request the access code and, in response to the access code being entered via the telephone, automatically access and deliver image data to the second communications system.

11. A surveillance system, according to claim 1, wherein the first and second communications system are included in a single communications system.

12. A surveillance system, according to claim 1, wherein the communications system includes at least two communication forms.

13. A surveillance system, according to claim 1, wherein the programmable surveillance system is further configured and arranged to gather and deliver image data to the second communications system responsive to the request.

14. A surveillance system, according to claim 1, wherein the camera includes a video camera, and wherein the image data includes video data.

15. A surveillance system, according to claim 1, wherein the programmable surveillance system further includes a microphone configured and arranged to capture audio, wherein the captured audio is processed as data by the first computer arrangement for transfer over the second communications system, and wherein the second computer arrangement processes audio data.

16. A surveillance system, according to claim 15, wherein the programmable surveillance system is further configured and arranged to gather audio in response to the request.

17. A surveillance system, according to claim 1, wherein the programmable surveillance system includes a videoconferencing device.

18. A surveillance system, according to claim 17, wherein the videoconferencing device has a multi-processor architecture that processes video data using a specialized DSP arrangement.

19. A surveillance system, according to claim 18, wherein the videoconferencing device includes a built-in display.

20. A surveillance system, according to claim 18, wherein the programmable surveillance system includes a built-in, integrated Internet circuit-access arrangement.

21. A surveillance system, according to claim 18, wherein the second computer arrangement includes a videoconferencing device.

22. A surveillance system, according to claim 1, wherein the programmable surveillance system is further configured to encode the image data prior to delivering the image data to the second communications system, and wherein the second computer arrangement is further adapted to decode the encoded image data.

23. A surveillance system, according to claim 22, wherein the encoded data includes a password, and wherein the second computer arrangement is adapted to decode the data using the password.

24. A surveillance system comprising:
a first communications system communicatively coupled and adapted to deliver a request for image data and including a telephone that is adapted to deliver a response to an audio menu;
a second communications system communicatively coupled and adapted to transmit image data;
a programmable surveillance system adapted to receive a telephone call from the telephone and including a first computer arrangement for processing data including image data, and including a camera configured and arranged to capture images, wherein the captured images are processed as data by the first computer arrangement, and wherein the programmable system is configured and arranged to receive the request for image data from the first communications system, and, in response to the request, to automatically access and deliver image data to the second communications system and in response to the telephone call, offer an audio menu of choices for delivery of the video data, and wherein the programmable surveillance system is further adapted to respond to the response to the audio menu; and
a second computer arrangement for communicatively coupling with the second communications system, and for processing data including image data, and configured and arranged to retrieve image data delivered by the first computer arrangement;
wherein the audio menu choices comprise at least one of:
requesting the initiation of a streaming video feed via the second communications system;
requesting the initiation of the delivery of images via the second communications system;
requesting that the programmable surveillance system hang up and dial into the second communications system;
requesting that the programmable surveillance system hang up and redial the number called from the first communications system;
requesting the initiation of the delivery of images to at least one of a plurality of locations; and
requesting the initiation of the delivery of images via at least one of a plurality of communications systems.

25. A surveillance system comprising:
means for generating a request and delivering the request via a first communications system;
means for automatically accessing image data via a first communication terminal having a first means for processing data including image data, responsive to the request;
means for transferring the image data over a second communications system; and
means for receiving the image data via a second means for processing data including image data, coupled communicatively with the means for transferring the image data over the second communications system.

26. A method for surveillance, comprising:
generating a request and delivering the request via a first communications system;
in response to receiving the request, automatically accessing image data via a first communication terminal having a first computer arrangement for processing data including image data;
transferring the image data over a second communications system; and
receiving the image data via a second computer arrangement for processing data including image data, and coupled communicatively with the first computer arrangement over the second communications system.

27. The method of claim 26, further comprising gathering image data.

28. The method of claim 27, wherein the image data includes video data.

29. The method of claim 28, further comprising delivering the video as streaming video over the Internet.

30. The method of claim 26, wherein the request includes a caller ID number.

31. The method of claim 26, further comprising protecting the image data.

32. The method of claim 31, wherein the image data is protected with a password.

33. The method of claim 31, wherein the image data is encrypted.

34. The method of claim 32, further comprising including the dynamic address of the first communications terminal as a part of the password.

35. The method of claim 26, further comprising:
accessing audio data via the first communications terminal in response to receiving the request;
transferring audio data over the second communications system; and
receiving the audio data via the second computer arrangement, wherein the second computer arrangement is adapted to process the audio data.

36. The method of claim 26, further comprising:
generating an audio menu of choices at the first communications terminal in response to receiving the request; and
selecting a choice from the audio menu via the first communications system, wherein transferring the image data includes transferring the image data in response to the choice made via the audio menu.

37. A surveillance system comprising:
a first communications system including a telephone and communicatively coupled and adapted to deliver a request for image data;
a second communications system communicatively coupled and adapted to transmit image data;

a programmable surveillance system including a first computer arrangement for processing data including image data, and including a camera configured and arranged to capture images, wherein the captured images are processed as data by the first computer arrangement, and wherein the programmable system is configured and arranged to receive a telephone call via the first communications system and, in response to the telephone call, to offer an audio menu of choices for delivery of the image data including the delivery of images via the second communications system, wherein the telephone is adapted to deliver a response to the audio menu, and wherein the programmable surveillance system is further adapted to respond to the response to the audio menu by accessing and delivering image data to the second communications system corresponding to the response to the audio menu delivered from the telephone; and a second computer arrangement for communicatively coupling with the second communications system, and for processing data including image data, and configured and arranged to retrieve image data delivered by the first computer arrangement.

* * * * *

UNITED STATES PATENT AND TRADEMARK OFFICE
CERTIFICATE OF CORRECTION

| | |
|---|---|
| PATENT NO. | : 7,202,884 B1 |
| APPLICATION NO. | : 09/885298 |
| DATED | : April 10, 2007 |
| INVENTOR(S) | : Barraclough |

It is certified that error appears in the above-identified patent and that said Letters Patent is hereby corrected as shown below:

Col. 5, before line 24 insert: "be".

In the Claims

Col. 9 line 16, Claim 8: In the claims, replace claim 8 with:
"A surveillance system comprising:

a first communications system communicatively coupled and adapted to deliver a request for image data and including a telephone that is adapted to deliver a response to an audio menu;

a second communications system communicatively coupled and adapted to transmit image data;

a programmable surveillance system adapted to receive a telephone call from the telephone and including a first computer arrangement for processing data including image data, and including a camera configured and arranged to capture images, wherein the captured images are processed as data by the first computer arrangement, and wherein the programmable system is configured and arranged to receive the request for image data from the first communications system, and, in response to the request, to automatically access and deliver image data to the second communications system and in response to the telephone call, offer an audio menu of choices for delivery of the video data, and wherein the programmable surveillance system is further adapted to respond to the response to the audio menu; and a second computer arrangement for communicatively coupling with the second communications system, and for processing data including image data, and configured and arranged to retrieve image data delivered by the first computer arrangement;

wherein the audio menu choices comprise at least one of:

requesting the initiation of a streaming video feed via the second communications system;

requesting the initiation of the delivery of images via the second communications system;

requesting that the programmable surveillance system hang up and dial into the second communications system;

UNITED STATES PATENT AND TRADEMARK OFFICE
CERTIFICATE OF CORRECTION

PATENT NO. : 7,202,884 B1  
APPLICATION NO. : 09/885298  
DATED : April 10, 2007  
INVENTOR(S) : Barraclough Page 2 of 2

It is certified that error appears in the above-identified patent and that said Letters Patent is hereby corrected as shown below:

requesting that the programmable surveillance system hang up and redial the number called from the first communications system;

requesting the initiation of the delivery of images to at least one of a plurality of locations; and       requesting the initiation of the delivery of images via at least one of a plurality of communications systems.

Signed and Sealed this

First Day of July, 2008

JON W. DUDAS  
*Director of the United States Patent and Trademark Office*